(12) United States Patent
Turina et al.

(10) Patent No.: US 7,054,629 B2
(45) Date of Patent: May 30, 2006

(54) METHOD AND MEANS FOR REDISTRIBUTION OF SUBSCRIBER INFORMATION IN UMTS NETWORKS WHERE THE NODES ARE ARRANGED IN POOLS

(75) Inventors: Klaus Turina, Backanag (DE); Martin Kaibel, Herzogonrath (DE); Monica Wifvesson, Aachen (DE); Åke Arvidsson, Ronneby (SE); Mikael Willgert, Spanga (SE); Hakan Niska, Linkoping (SE); Kyosti Toivanen, Kyrkslatt (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 10/487,377

(22) PCT Filed: Aug. 24, 2001

(86) PCT No.: PCT/SE01/01808

§ 371 (c)(1), (2), (4) Date: Aug. 2, 2004

(87) PCT Pub. No.: WO03/019958

PCT Pub. Date: Mar. 6, 2003

(65) Prior Publication Data

US 2004/0248592 A1 Dec. 9, 2004

(51) Int. Cl.
H04Q 7/20 (2006.01)

(52) U.S. Cl. .................. 455/432.1; 455/436; 455/435.2

(58) Field of Classification Search ............. 455/432.1, 455/436, 453, 435.2
See application file for complete search history.

(56) References Cited

U.S. PATENT DOCUMENTS

| | | | | |
|---|---|---|---|---|
| 5,278,890 | A | * | 1/1994 | Beeson et al. ............. 340/7.24 |
| 5,918,175 | A | * | 6/1999 | Tayloe et al. ............... 455/427 |
| 5,920,814 | A | * | 7/1999 | Sawyer et al. ........... 455/422.1 |
| 6,073,017 | A | * | 6/2000 | Xu et al. .................. 455/435.1 |
| 6,097,951 | A | * | 8/2000 | Ernam et al. ............... 455/433 |
| 6,661,782 | B1 | * | 12/2003 | Mustajarvi et al. ......... 370/331 |
| 6,788,670 | B1 | * | 9/2004 | Larsson ...................... 370/351 |
| 6,823,295 | B1 | * | 11/2004 | Bauer ............................ 703/2 |
| 2002/0027891 | A1 | * | 3/2002 | Mimura ...................... 370/331 |
| 2003/0002490 | A1 | * | 1/2003 | Wong et al. ................ 370/355 |
| 2005/0025116 | A1 | * | 2/2005 | Chen et al. ................. 370/349 |

* cited by examiner

Primary Examiner—William Trost
Assistant Examiner—Ariel Balaoing
(74) Attorney, Agent, or Firm—Roger Burleigh

(57) ABSTRACT

The present invention relates to method and means for a system initiated subscriber information redistribution in order to achieve a load redistribution within a pool of core network nodes. The subscribers, that are affected by the redistribution, are determined by the bit values in their TMSI's. These specific TMSI's are then arranged to be treated as invalid by the cellular system. Messages etc. from subscribers with invalid TMSI's will be "trapped" in the cellular system and the subscriber information that belongs to these subscribers will be redistributed to new core network nodes.

23 Claims, 5 Drawing Sheets

METHOD AND MEANS FOR REDISTRIBUTION OF SUBSCRIBER INFORMATION IN UMTS NETWORKS WHERE THE NODES ARE ARRANGED IN POOLS

TECHNICAL FIELD OF THE INVENTION

The present invention relates in general to the field of cellular radio communication and, in particular, to a method and means for providing a redistribution of subscriber information in a cellular radio communication system with at least one pool of core network nodes.

DESCRIPTION OF RELATED ART

A cellular radio communication system is normally divided into an access network and a core network. The access network in GSM includes the Base Transceiver Stations (BTS) and control nodes such as the Base Station Controller (BSC) while the core network includes core network nodes (CNN) such as the Mobile Switching Centre (MSC), the Visiting Location Register (VLR), the Home Location Register (HLR) and also the GPRS Support Node (GSN) if General Packet Radio Service (GPRS) is included in the cellular system. An example of a GSN is the Serving GPRS Support Node (SGSN).

The next generation cellular radio communication system, i.e. the $3^{rd}$ generation, is called IMT 2000 by ITU (the International Telecommunication Union) and includes the Universal Mobile Telecommunications System (UMTS). The access network in UMTS includes the base transceiver stations (Node B) and control nodes such as the Radio Network Controller (RNC) while the core network includes the same types of nodes as the GSM system (as described above) and also new types of nodes such as the MSC server, the Circuit switched Media Gateway Function (CS-MGW) and the Home Subscriber Server (HSS). When MSC is written throughout this document this should be read as MSC or MSC server.

Each control node in the access network (BSC or RNC) is served by one specific MSC, and each MSC in the core network is served by one specific VLR in known GSM and UMTS systems. This means that each control node always communicates with one dedicated MSC that serves a specific geographical area of the cellular system, i.e. an MSC Service Area and that each MSC always communicates with one dedicated VLR. When a mobile station requests a service from the cellular system it will be connected to the MSC of the current MSC Service Area by one of the control nodes. The subscriber information of the mobile subscriber, that is using the mobile station, is stored in the VLR that serves the MSC, i.e. the mobile subscriber is registered in this VLR. It is a common practice to combine the VLR with the MSC into an MSC/VLR, which means that the mobile subscriber is registered in an MSC/VLR.

A proposed new type of architecture for a cellular radio communication system is to create a pool of core network nodes, e.g. a pool of MSC/VLR's, that is connected to one or more access networks, e.g. to control nodes, in the system. This means that each control node can access a number of MSC/VLR's and that an MSC/VLR in a pool of MSC/VLR's can serve a mobile station in a larger geographical area than in a "normal" MSC service area. This service area that is supported by all MSC/VLR's in the MSC-pool is called MSC-pool service area. In this case, the MSC service area of each MSC/VLR in the pool will be the same area as the MSC-pool service area. A pool of core network nodes is also called a CNN-pool. If it is a pool of MSC/VLR's it is called an MSC-pool for simplicity and if it is a pool of SGSN's it is called an SGSN-pool. This new architecture will reduce the amount of inter MSC handovers, reduce the amount of inter MSC/VLR location updates and reduce the amount of inter SGSN routing area updates. This new architecture will also provide an easy and smooth way to add (e.g. to increase capacity) or remove (e.g. for maintenance) MSC/VLR's, SGSN's or other types of core network nodes arranged in pools in the cellular system.

Each subscriber that is registered in a CNN-pool is given a core network node identifier (CNNI) that identifies the core network node in which it is registered, e.g. an MSC/VLR or SGSN. The CNNI's are then used by the control nodes to route the communication sessions (e.g. voice calls or data transfers) to the right core network node in the CNN-pool. These identifiers are valid as long as they can be mapped to a CNN address. This means that load-distribution (and load-balancing) among the nodes in the CNN-pool in reality only occurs when CNNI's are assigned. This happens when a new mobile station is switched on the first time by a subscriber, or when a subscriber with a CNNI from a first CNN-pool roams into the service area of a second CNN-pool. This load-distribution is handled by a distribution function in the control nodes, where the control nodes use a distribution algorithm to select a core network node. This is sufficient under normal conditions but situations of unbalance can occur, for example when a CNN is reopened after being closed for service or maintenance, or when a new CNN is added to a pool. As the current ability to perform load balancing is dependent on subscriber mobility (roaming in and out of the CNN-pool) it is now seen as a potential problem that over time situations of unbalanced load could prevail for quite some time in the CNN-pool. In such situations there is a need for the system to immediately initiate a redistribution of subscriber information between the core network nodes in the pool, i.e. to move the subscriber information associated with specific subscribers. This should of course not affect the end users experience with the mobile station, especially service availability and reachability must be guaranteed. A redistribution of subscriber information is also needed in cases where one or more core network nodes are removed or disconnected from the MSC-pool (e.g. during maintenance). Hence, there is a need for a method and means that enables the system to initiate a redistribution (i.e. the move) of subscriber information between the core network nodes in a CNN-pool irrespective of the subscriber mobility.

By a mobile station is meant all portable equipment intended for radio communication, like mobile stations, transceivers, pagers, electronic notebooks, laptops with integrated radios, communicators, tailored microchips connected to radios or any other portable electronic equipment that is using a radio link as a means of communication.

SUMMARY

The present invention meets a problem related to a cellular radio communication system, and in particular, to redistribution of subscriber information in a cellular radio communication system where a pool of core network nodes (e.g. MSC/VLR's) is arranged to serve at least one access network.

The problem is to find a way to redistribute subscriber information between core network nodes in a CNN-pool.

In light of the foregoing, a primary object of the present invention is to provide method and means to redistribute subscriber information between core network nodes in a CNN-pool.

A further object of the present invention is to provide method and means for enabling the cellular system to perform the redistribution of subscriber information irrespective of the subscriber mobility.

Accordingly, the present invention provides a method as claimed in claim 1.

A core network node and a control node, as claimed in claims 21–25 and 26–28 respectively, are also provided.

The present invention also provides a system as claimed in claim 29.

Embodiments of the present invention are characterised as it appears from the sub-claims.

An advantage with the present invention is that load-balancing between core network nodes in a CNN-pool can be made in a controlled and quick way.

Another advantage is that the redistribution affects all types of subscribers within the CNN-pool equally (and not only the most active subscribers) such that the restored load balance is insensitive to variations in subscriber activity.

Yet another advantage is that the redistribution can be performed in existing and new GSM and UMTS networks and in particular with existing mobile stations.

A further advantage is that few (if any) measurements are needed to perform the redistribution.

Another advantage is that the process of removing or adding core network nodes in a CNN-pool can be made in a smooth way by redistributing stored subscriber information to/from these core network nodes.

A further advantage is that the reachability and service availability of users are not affected.

A still further advantage is that the amount of load, that is temporarily caused by the redistribution, can be controlled by the CNN's.

A yet further advantage is that subscribers that are to be affected by the redistribution can be selected by a number of different criteria.

DETAILED DESCRIPTION OF EMBODIMENTS

Figure 1A:
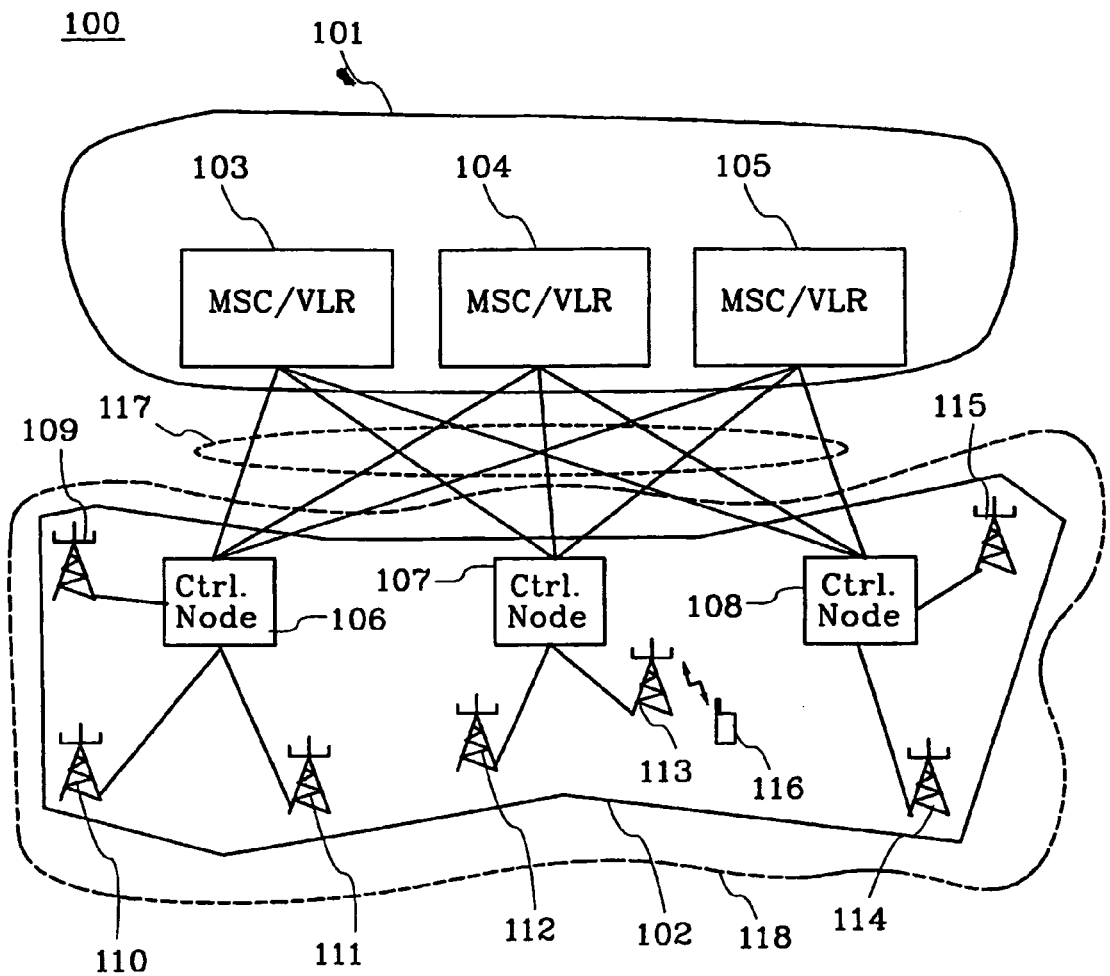
FIG. 1a is illustrating a view of a first cellular radio communication system with a number of core network nodes arranged in a pool.
Figure 1B:
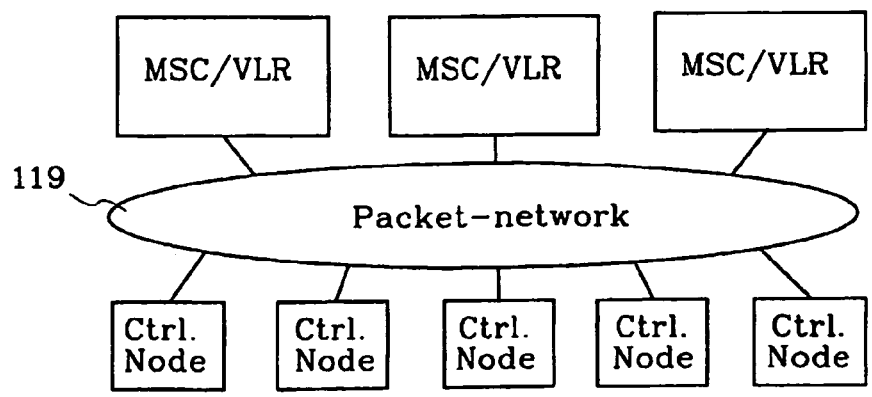
FIG. 1b is illustrating a simplified view of a second cellular radio communication system with a pool of core network nodes.

FIG. 1a illustrates a simplified view of an example of a cellular radio communication system 100 with an MSC-pool 101, connected to an access network 102. The MSC-pool 101 includes three MSC/VLR's 103–105 (that belong to the core network). The three MSC/VLR's in the MSC-pool 101 are connected to three control nodes (Ctrl nodes) 106–108 in the access network 102. The control nodes 106–108 can, as an example, be Base Station Controllers in a GSM-system or Radio Network Controllers in a UMTS-system. The control nodes 106–108 are connected to a number of base stations 109–115, e.g. Base Transceiver Stations in a GSM-system or Node B's in a UMTS-system. The MSC-pool 101 supports an MSC-pool service area 118 that is served by the access network 102. Other parts of the access and core network are not illustrated in FIG. 1a for simplicity. The connection 117 between the MSC/VLR's 103–105 and the control nodes 106–108 can be arranged by circuit connections as illustrated in FIG. 1a or by a packet network 119, e.g. an IP network, as illustrated in FIG. 1b. The cellular radio communication system 100 also includes a number of mobile stations that are used by the subscribers. For simplicity only one mobile station 116 is illustrated. The MSC/VLR's, the control nodes and the mobile stations are examples of system units in the cellular radio communication system 100.

All control nodes 106–108 in the access network 102 can access any one of the MSC/VLR's 103–105 in the MSC-pool 101, which means that the control nodes can distribute the traffic generated via the radio access over all the MSC/VLR's 103–105 in the MSC-pool. The known Temporary Mobile Subscriber Identity (TMSI) can be used as a help for the control nodes to find specific MSC/VLR's in the pool.

The use of the TMSI is extended, by letting some or even all of the bits in the TMSI represent a core network node identity. This is done without affecting the known use of the TMSI to identify the mobile subscribers. The bits that are used to represent a core network node identity are called the core network node identifier (CNNI) and the bits that are used to represent the identity of the subscriber are called the user identity (UI). Each of the MSC/VLR's in e.g. the MSC-pool 101 is given a specific number of the TMSI's that are used in the cellular system, i.e. a unique subrange of the whole TMSI range in the cellular system. This means that each TMSI will become associated with a specific MSC/VLR. When a mobile station roams into e.g. the MSC-pool service area 118 and performs location updating the first time via the radio access, the distribution function of the control node in charge distributes the location updating to one of the MSC/VLR's in the MSC-pool 101 according to a distribution algorithm. When the MSC/VLR, e.g. MSC/VLR 105, receives the location updating from the new mobile station it will register the mobile subscriber in the VLR-part of the MSC/VLR 105 and assign a TMSI from its dedicated set of TMSI's to the mobile subscriber. The MSC/VLR 105 provides this TMSI to the mobile station (that is used by the subscriber) where it is stored. The mobile station uses the allocated TMSI (the whole or only the CNNI part) in the next radio accesses with the MSC-pool service area 118. The TMSI (or CNNI) is analysed by the control node in charge, e.g. control node 107, so that the control node can forward the traffic to the MSC/VLR 105 where the mobile subscriber has been registered, i.e. the MSC/VLR that is associated with the used TMSI. The control node translates the TMSI to an actual MSC/VLR address, e.g. with the help of a CNNI-address table, before it can address the MSC/VLR 105.

The TMSI is an example of an existing identifier that can include a CNNI and still be used for its original purpose. A completely new identifier that is only used as a CNNI, i.e. that is not part of a TMSI, can also be used as a possible distribution mechanism in the control nodes.

The present invention provides method and means for a system initiated redistribution of subscriber information in order to achieve a load redistribution within the CNN-pool.

In general, one or more subscribers are selected and the corresponding subscriber information is redistributed. These subscribers are identified and/or selected by the bit values in their TMSI's. These TMSI's are then arranged to be treated as invalid by the cellular radio communication system. Messages etc. from subscribers with invalid TMSI's will be "trapped" in the cellular radio communication system and the subscriber information associated with these subscribers is redistributed to new (or some times even the same) core network nodes. This means that the system can control the redistribution.

The selection of subscribers mentioned above is made at random with equal probability for all subscribers. The selection may also be restricted to certain subsets of subscribers e.g. subscribers which use prepaid cards or subscribers which subscribe to certain services which not all nodes can support. TMSI's that are arranged to be treated as invalid are mentioned here as "invalid TMSI's". Invalid TMSI's could be one or more specific TMSI's with unique numbers or bit patterns, e.g. with unique UI numbers, that are only used as invalid TMSI's by the cellular system or within a certain CNN-pool. Invalid TMSI's could also be normal TMSI's, i.e. valid TMSI's, that are temporarily treated as invalid during the process of redistribution.

In cases where all subscribers in one or more core network nodes are affected by a redistribution it is enough to select and/or detect the CNNI's that identify the core network node(s) under redistribution. In cases where only a part of the subscribers is affected by the redistribution or where the redistribution is to be done in several steps, there is a need to select and/or detect individual subscribers. This selection and detection are made either directly, based on one or more bit values in the TMSI's, e.g. in the UI part, or indirectly, based on the result of a mathematical function in which a part of the TMSI's, e.g. the UI part, is used as an input. As an example, the Pseudo Random Number Generators (PRNG's) can be used to perform such a mathematical function.

In a first example to select and detect individual TMSI's that are to be treated as invalid, a whole TMSI with a certain bit pattern of '0' and/or '1' is used, e.g. "1010... . . 0" (i.e. AAAAAAAA in hexadecimal). In a second example, only a part of the TMSI is used, e.g. the UI with the pattern "all bits equal to 0" or "the last bit equal to 1". The second example can be used in cases where the redistributed subscriber information is not to be "moved back" to the same core network node again after the redistribution, e.g. in cases where an MSC/VLR is to be removed from an MSC-pool. The CNNI part of the TMSI is kept unchanged so that it is possible for the control node to detect which MSC/VLR the redistribution algorithm should skip. This also implies that the UI's are separated from the CNNI's in the TMSI's in this case.

Hence, the subscribers, that are affected by the redistribution, are selected and detected based on bit values (directly or indirectly) in their TMSI's and not depending on the place and time at which the subscribers make contact with the cellular system. More details are disclosed in connection with the embodiments below.

For simplicity, only MSC-pools and TMSI's are illustrated in the following embodiments. If GPRS is implemented and a pool of SGSN-s is arranged in the cellular system, the P-TMSI (packet-TMSI) can be used in a similar way as the TMSI mutatis mutandis.

Figure 2:
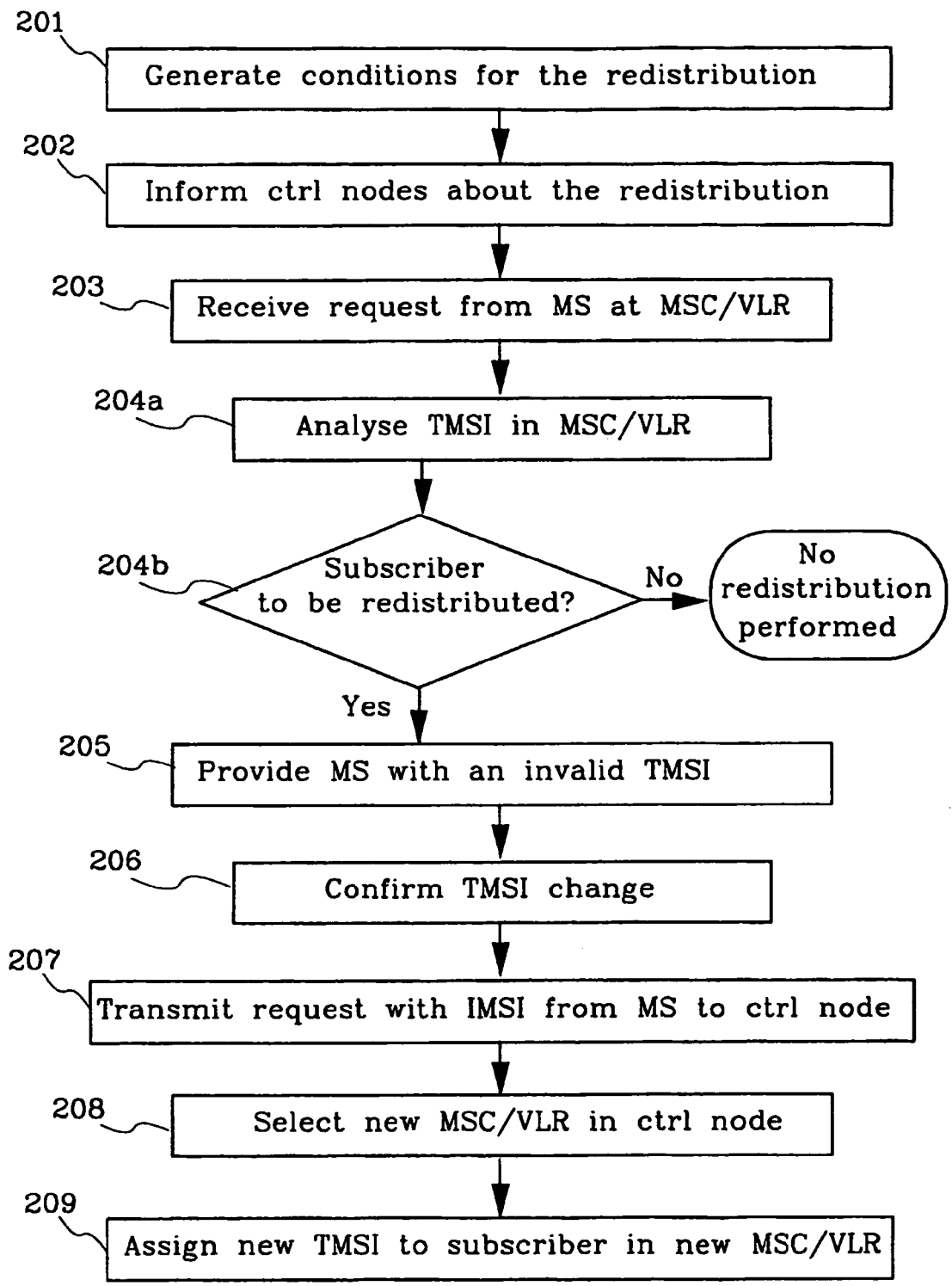
FIG. 2 is illustrating a flow chart of a first embodiment of the method according to the present invention.

FIG. 2 illustrates a flowchart of a first embodiment of the method according to the present invention. The first embodiment is applied in the system that is illustrated in FIG. 1a.

This means that there will be references to FIG. 1a as well as to FIG. 2. The subscriber that uses the mobile station 116 is currently registered in MSC/VLR 104. A load-unbalance has been detected in the MSC-pool 101 and a decision to activate the redistribution is taken. This decision can be made by the operator or automatically based on the operation of a load supervision programme or similar. This load supervision programme can as an example be part of a pool or network management system arranged in the cellular system, e.g. in MSC/VLR's and SGSN's. The programme can detect the need for a redistribution and automatically activate the redistribution operation.

According to a step 201 in FIG. 2, the operator of the cellular system 100 generates the conditions for the redistribution by deciding from which MSC/VLR subscriber information is to be moved and the number (or fraction) of subscribers to be affected by the redistribution. In this case it is determined that all the subscribers in MSC/VLR 104 are to be affected by the redistribution, i.e. the corresponding subscriber information is to be redistributed within the MSC-pool 101.

According to a step 202, the operator of the cellular system 100 informs the control nodes 106–108, e.g. by O&M commands, that the MSC/VLR 104 is affected by a redistribution.

According to a step 203, the MSC/VLR 104 receives a first mobile originating request, e.g. a location update request message, (that includes a TMSI) from the mobile station 116.

According to steps 204a–b, the MSC/VLR 104 analyses the TMSI. As the CNNI part identifies MSC/VLR 104, which currently is affected by the redistribution, it continues with step 205 below. Otherwise, it would have continued as usual with the location update without any redistribution.

According to step 205, the MSC/VLR 104 provides the mobile station 116, via access network 102, with a predefined invalid TMSI $X_i$ through a TMSI-reallocation procedure (which is a standardised procedure to assign and change the TMSI in mobile stations). The TMSI $X_i$ includes the number FFFFFFFF in hexadecimal. The mobile station 116 stores TMSI $X_i$ without checking the validity of it (defined in the standard document 3GPP TS 23.003). This means that the mobile station is forced to change its TMSI by the MSC/VLR 104.

According to a step 206, the mobile station transmits a TMSI reallocation complete message, confirming the change of TMSI, to the control node 107 which forwards the message to the MSC/VLR 104.

According to a step 207, the mobile station transmits a second mobile originating request (e.g. a second location update) including the IMSI (instead of the stored TMSI $X_i$), to the control node 107. It has been defined in the 3GPP TS 24.008 standard that if there is no TMSI available in the memory reserved for TMSI in the SIM card (in the mobile station) this memory must be filled with "all bits set to '1'", i.e. FFFFFFFF in hexadecimal. As the TMSI $X_i$ includes "all bits set to '1'", the presently stored TMSI will make the mobile station to act as if there where no TMSI in the memory and it will use the IMSI in its next network access. The mobile station is there by forced to use the IMSI instead of a TMSI. This implies that a TMSI with number FFFFFFFF in hexadecimal is not intended to be used by the cellular system in normal cases.

According to a step 208, the control node 107 uses the distribution algorithm to select a new MSC/VLR for the subscriber, in this case MSC/VLR 103, and forwards the request to MSC/VLR 103. This is done because the control node received an IMSI and not a TMSI. Note that it is the "normal" distribution algorithm that is used in this step.

According to a step 209, MSC/VLR 103 assigns a new (valid) TMSI to the subscriber, registers the subscriber and provides the mobile station 116 with the new TMSI. The new TMSI contains a CNNI that identifies MSC/VLR 103.

This new TMSI is now used by the mobile station 116 for its subsequent network access(es), and any control node in the access network 102 will be able to route a request or any other kind of traffic towards the MSC/VLR 103. This means that the subscriber information that belongs to the subscriber that uses mobile station 116 has been redistributed from MSC/VLR 104 to MSC/VLR 103. As the normal distribution algorithm was used the subscriber information could also have been redistributed to MSC/VLR 104.

The TMSI $X_i$ can of course not be used for paging, e.g. if a terminating call is addressed to the subscriber during the time the mobile station 116 has TMSI $X_i$ (step 205–209). In this case the MSC/VLR has to use the IMSI to page the subscriber. Hence, the reachability of the subscriber is not affected.

The MSC/VLR 104 can, as a first alternative in step 205 above, provide the mobile station 116 with an invalid location area identity (LAI) together with the invalid TMSI to trigger an immediate second access from the mobile station according to step 207. This will speed up the redistribution operation. The mobile station will detect the change of LA and initiate a new location update immediately. The invalid LA should be one that is not used anywhere in the cellular system.

The MSC/VLR 104 can, as a second alternative in step 205 above, provide the mobile station 116 with a combination of an LAI and an IMSI (or a new TMSI) through the TMSI-reallocation procedure (instead of the TMSI $X_i$). This means that the mobile station 116 will delete its old (valid) TMSI as stated in 3GPP TS 24.008 chapter 4.3.1.1 ("The TMSI REALLOCATION COMMAND message contains a new combination of TMSI and LAI allocated by the network or a LAI and the IMSI if the used TMSI shall be deleted."). This will also force the mobile station 116 to use the IMSI (or the new TMSI) at its next network access as in step 207. Steps 207 and 208 are the same as before.

The MSC/VLR 104 can, as a third alternative in step 205 above, provide the mobile station 116 with a specific LAI or a specific TMSI that are used as action indicators. That is, different specific LAIs or different special TMSIs (which cannot be used for normal purposes) are taken as action pointers in a table in the control nodes. For example LAI $Z_1$ may mean "this subscriber should be sent to MSC/VLR 103 in the pool", LAI $Z_2$ may mean "this user should be sent to MSC/VLR 105 in the pool" etc. The specific TMSI (which cannot be used for normal purposes) would serve the same purpose. If LAI's are used together with the IMSI then the LAI could still a specific LAI that indicate such specific actions.

The control node 107 will, in step 208 above, detect the specific LAI (or TMSI) as belonging to the class of "special" LAI's (or TMSI's) which are not used to indicate LA or user ID but to indicate specific actions. It will then use these specific LAI's (or TMSI's) as inputs to control the selection of a new MSC/VLR in step 209. This means that the (re)distribution function is controlled by the specific LAI (or TMSI) which were assigned by the MSC/VLR 104. In this way can MSC/VLR 104 indirectly make the control node 107 to redistribute the subscriber information to e.g. MSC/VLR 103.

According to a step 201 above, all the subscribers in MSC/VLR 104 are to be affected by redistribution. But if e.g. only 50% where to be redistributed in this embodiment there would be a need to select those 50% out of the subscribers in MSC/VLR 104. This selection can as an example be made by random and specifically by the use of PRNG's. This is further described after the third embodiment where the PRNG's have been further described.

Figure 3:
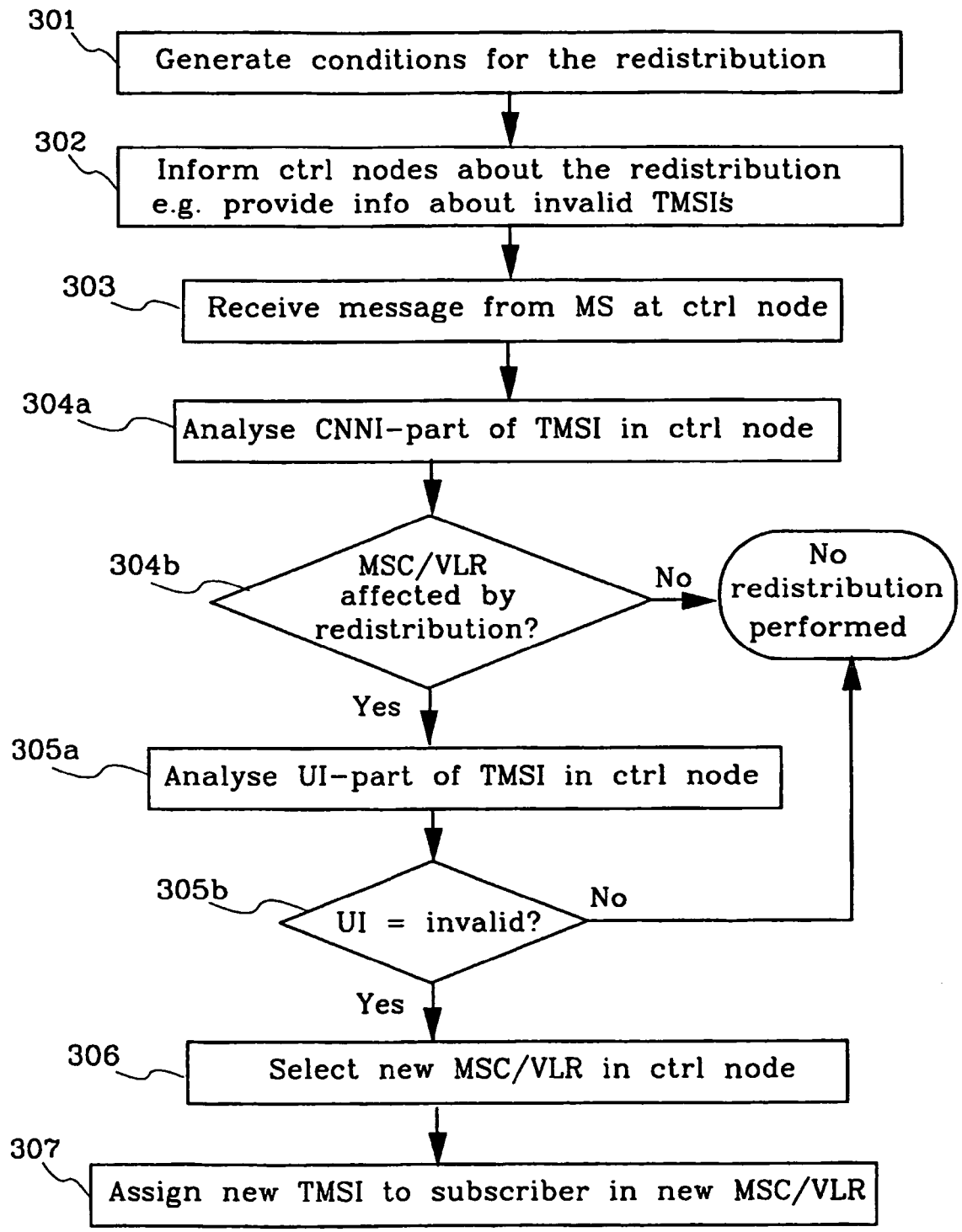
FIG. 3 is illustrating a flow chart of a second embodiment of the method according to the present invention.

FIG. 3 illustrates a flowchart of a second embodiment of the method according to the present invention. The method is applied in the system that is illustrated in FIG. 1a. This means that there will be references to FIG. 1a as well as to FIG. 3. The subscriber that uses the mobile station 116 is currently registered in MSC/VLR 104. A load-unbalance has been detected in the MSC-pool 101 and a decision to activate the redistribution is taken. This decision can be made by the operator or automatically based on the operation of a load supervision programme or similar as stated in connection with the first embodiment.

According to a step 301 in FIG. 3, the operator of the cellular system generates the conditions for the redistribution by deciding from which MSC/VLR subscriber information is to be moved, the number (or fractions) of subscribers to be affected by the redistribution and to which MSC/VLR's the corresponding subscriber information should be redistributed. In this case it is determined that 50% of the subscribers in MSC/VLR 104 are to be affected by the redistribution, i.e. the subscriber information associated with 50% of the subscribers in MSC/VLR 104 will be redistributed. To achieve this, all subscribers with a TMSI that includes a CNNI that identifies MSC/VLR 104 and a UI with "the last bit equal to 0" are to be treated as invalid and redistributed to MSC/VLR 103 or 105. The MSC/VLR 104 stops to assign such TMSI's as long as the redistribution procedure continues.

According to a step 302, the operator informs the control nodes 106–108 in the access network 102 through O&M commands that TMSI's with CNNI's that identify MSC/VLR 104 and UI's with "the last bit equal to 0" are to be treated as invalid.

According to a step 303, the control node 107 receives a mobile originating request e.g. a location update, that includes a TMSI, e.g. a location update, from the mobile station 116.

According to steps 304a–b, the control node 107 analyses the CNNI in the TMSI. As the CNNI indicates MSC/VLR 104, which currently is affected by the redistribution, the control node continues with step 305 below. Otherwise, the control node would have continued as usual and forwarded the message to MSC/VLR 104.

According to steps 305a–b, the control node 107 analyses the UI in the TMSI. As the last bit in the UI is equal to 0, which indicates that this TMSI is to be treated as invalid and that the redistribution algorithm is to be used, the control node continues with step 306 below. Otherwise, the control node would have continued as usual and forwarded the message to MSC/VLR 104.

According to step 306, the control node 107 uses the redistribution algorithm to select a new MSC/VLR for the subscriber, in this case MSC/VLR 103 and forwards the message to MSC/VLR 103. It could also have been MSC/VLR 105. The MSC/VLR 104 is in this case excluded in the redistribution algorithm.

According to a step 307, the MSC/VLR 103 assigns a new (valid) TMSI to the subscriber, registers the subscriber and provides the mobile station 116 with the new TMSI. The new TMSI contains a CNNI that identifies MSC/VLR 103 and an unoccupied UI. The subscriber information that belongs to the subscriber is now redistributed from MSC/VLR 104 to MSC/VLR 103. The MSC/VLR 103 can detect that the subscriber has been registered in MSC/VLR 104. Hence it can get the IMSI of the subscriber from MSC/VLR 104 and other parts of the subscriber information from the HLR.

Steps 303–307 are repeated for each access as long as the redistribution is in progress. The redistribution is terminated when all or most of the subscribers that are registered in MSC/VLR 104 and with the last bit equal to '0' in their UI's, i.e. all or most subscribers with invalid TMSI's, have been moved. (When a subscriber can switch off its phone for a very long time it is advantageous in many cases to terminate the redistribution when most of the subscribers have been moved instead of all. A suitable termination point can be determined by monitoring load levels or by using different timing procedures, e.g. continue during a couple of periodic location update intervals or to use a timer).

The number of subscribers that are affected by the redistribution determines the number of bits in the UI that the control node has to inspect in the analysis in step 305. In general N bits are inspected, and in the embodiment above N=1 was used (the last bit) which allows n×50% (n=0, 1, 2) of all UI's to be used for invalidating TMSI's. A finer resolution can be obtained with a larger N, e.g. N=4. This allows n×6.25% (n=0, 1, . . . , 16) of all UI's to be used for invalidating TMSI's. This means that four bits in the UI must be inspected in the analysis in step 305. The CNNI could be used instead of the UI in cases where all or a large number of subscribers are affected, e.g. if an MSC/VLR has more than one CNNI.

The invalid TMSI's in the embodiments above are determined directly from their bit values. As an alternative, these invalid TMSI's can be determined indirectly from their bit values with the help of pseudo random numbers that have been calculated by a PRNG. PRNG's are known to produce series of numbers that have random properties. A PRNG uses a start number called "the seed", which is used to compute a first PRNG number. The first PRNG number is then used to compute a second PRNG number and so on. The general form is $R(M)=F(R(M-1))$ where $R(0)$ is the seed. As an example, the Lehmer generator suggests that $R(M)=(c*R(M-1)+a) \bmod m$.

The use of PRNG's, with the UI as the seed, means that TMSI's with different and random bit patterns/numbers can be selected as the invalid ones, i.e. not only those with e.g. UI's that ends with a '0' or similar. This leads to a less "bit-biased" selection than if the invalidation is based directly on some special bits or patterns in the TMSI's. Any fraction of subscribers can be moved without keeping track of which UI's that are in use. It is noted that the PRNG's will give the same random number from a given UI each time it is run. Hence a subscriber will either be moved the first time it accesses the system or not at all. It is also noted that all control nodes 106–108 must use the same PRNG and run it the same number of times during each redistribution operation. Moreover, the MSC/VLR's should preferably not change the UI's of its subscribers while the redistribution operation is in progress and not assign UI's which will be treated a invalid.

A different PRNG is used or the generator formula is run a different number of rounds, for each load redistribution operation.

The first alternative typically means that one or two constants (e.g. c and a in the Lehmer generator) in the formula will take new values for each load redistribution operation but the basic formula will stay the same.

The second alternative typically means that the recursive procedure described above will be run one more time for each load redistribution operation before the result is used for making a decision. This means that the M:th random number starting from the seed UI will be used during the M:th load redistribution operation. After a sufficiently long time has passed since the first operation will the memory fade such that the first generator can be reused, or M can be reset to one.

Figure 4:
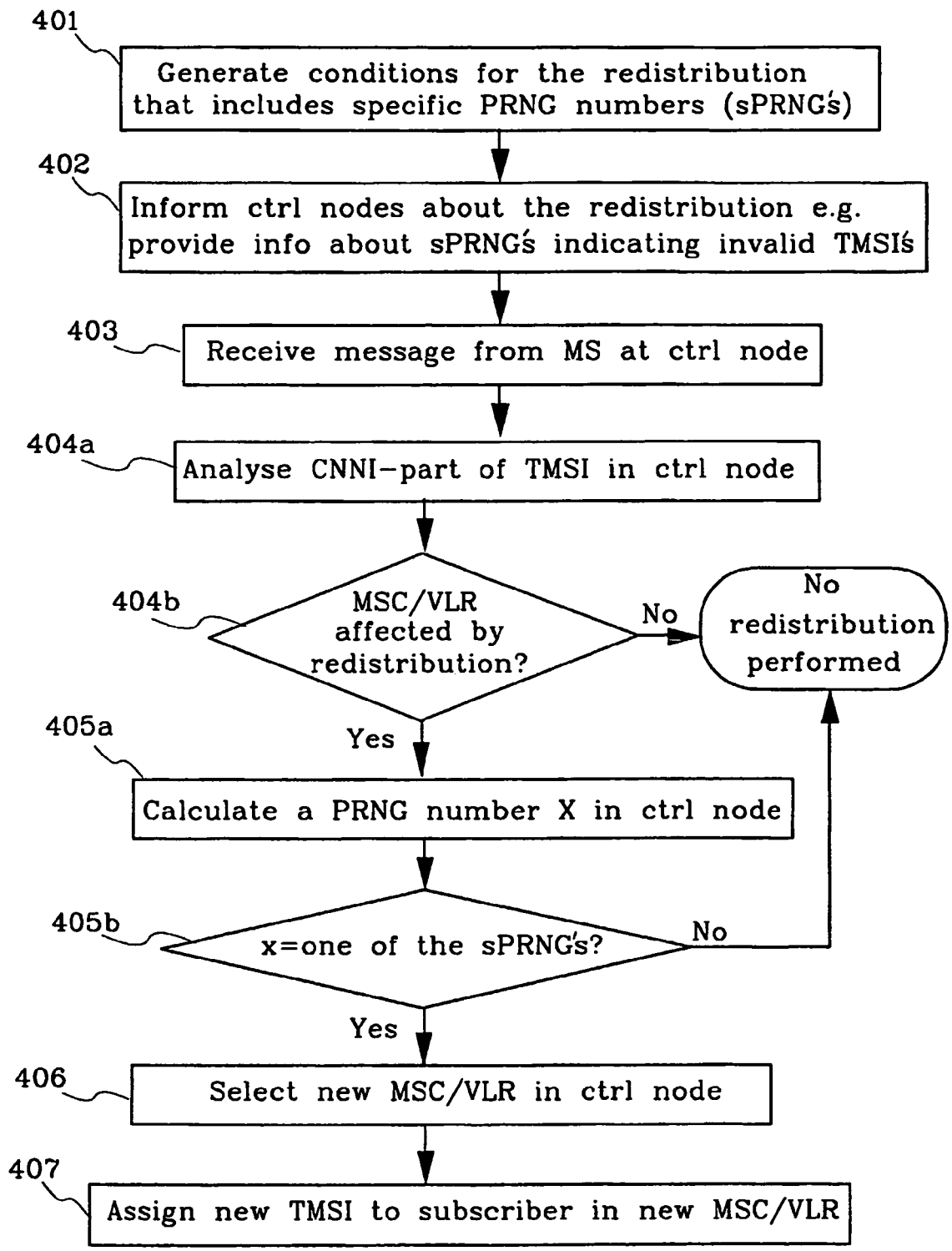
FIG. 4 is illustrating a flow chart of a third embodiment of the method according to the present invention.

FIG. 4 illustrates a flowchart of a third embodiment of the method according to the present invention. The same prerequisites as in the second embodiment, according to FIG. 3, apply.

According to a step 401 in FIG. 4, the operator of the cellular system generates the conditions for the redistribution by deciding from which MSC/VLR subscriber information is to be moved, the number (or fraction) of subscribers to be affected by the redistribution and how the corresponding subscriber information should be redistributed between the MSC/VLR's. In this case it is determined that 50% of the subscribers in MSC/VLR 104 are to be affected. To achieve this, TMSI's that includes CNNI's that identifies MSC/VLR 104 and with UI's that generates PRNG numbers that ends with a bit equal to zero are to be treated as invalid and the corresponding subscriber information is to be redistributed to MSC/VLR 103 or 105.

According to a step 402, the operator of the cellular system informs the control nodes 106–108 and MSC/VLR 104 through O&M commands that the MSC/VLR 104 is affected by a redistribution, the PRNG numbers that indicates invalid TMSI's and that the redistribution will be to MSC/VLR 103 or 105. The control nodes 106–108 configure their PRNG's, i.e selects which generator to use by downloading the right constants or determine the right iteration limit, and their (re)distribution tables. The MSC/VLR 104 stops to assign TMSI's with UI's that generates PRNG numbers that ends with a bit equal to zero.

According to a step 403, the control node 107 receives a mobile originating request, e.g. a location update, that includes a TMSI from the mobile station 116.

According to steps 404a–b, the control node 107 analyses the CNNI in the TMSI. As the CNNI indicates MSC/VLR 104, which currently is affected by the redistribution, the control node continues with step 405 below. Otherwise, the control node would have continued as usual and forwarded the message to MSC/VLR 104.

According steps 405a–b, the control node 107 calculates a PRNG number with the UI as a seed. If the last bit in the PRNG number is equal to 0, which indicates that the subscriber information of this subscriber is to be redistributed and that the redistribution algorithm is to be used, the control node will treat this TMSI as invalid and continue with step 406 below. Otherwise, the control node will continue as usual and forward the message to MSC/VLR 104.

The following steps 406 and 407 are identical to steps 306 and 307 according to FIG. 3.

Steps 403–407 are repeated for each access as long as the redistribution is in progress. The redistribution is terminated when all or most of the subscribers with an UI that generates a PRNG number that ends with a bit equal to zero, i.e. all or most subscribers with invalid TMSI's, have been moved from MSC/VLR 104 to MSC/VLR 103 or 105. (When a subscriber can switch off its phone for a very long time it is advantageous in many cases to terminate the redistribution when most of the subscribers have been moved instead of all. A suitable termination point can be determined by monitoring load levels or by using different timing procedures, e.g. continue during a couple of periodic location update intervals or to use a timer).

The PRNG's can, as previously stated, also be used in the first embodiment according to FIG. 2, if less than 100% of the subscribers are to be affected by the redistribution, i.e. to randomly select a certain fraction of the subscribers in MSC/VLR 104. The PRNG is run for all present users in MSC/VLR 104, one by one, during e.g. step 202. The result is then stored in MSC/VLR 104 by, e.g., setting an invalidation bit in the record of the selected subscriber. When a subscriber accesses the system in step 203 will the MSC/VLR 104 check this invalidation bit in step 204b, and if it is marked as invalid, continue with step 205–209 as previously described. An alternative to this is to run the PRNG each time a user accesses the MSC/VLR 104 and make the selection then. In the latter case is the TMSI used as seed to ensure the same outcome for each mobile originating access, in the former case can any seed be used as the outcome is only decided once and then stored.

The PRNG's can also be used to select subscribers in cases where one or more pre-defined UI's are used by the core network nodes to indicate TMSI's that are to be treated as invalid by the control nodes in the access network. Such a pre-defined UI is taken out of the normal use of UI's in the system (or CNN-pool) and all control nodes are programmed to treat TMSI's with such a pre-defined UI as invalid TMSI'S. If more than one pre-defined invalid UI is used, can each one of these UI's indicate both an invalid TMSI and the use of a specific distribution algorithm in the control nodes.

By using pre-defined invalid UI's and maintaining the original CNNI's it is easy for the system, e.g. the control nodes, to determine when a mobile originating access concerns a redistribution of an already registered subscriber and not a distribution of a new unregistered subscriber. This enables the control nodes to select a specific redistribution algorithm, which is different from the normal distribution algorithm, and avoid selecting the previous MSC/VLR again (if it is required). It is further possible for the system to use different special invalid UI's to indicate different redistribution actions (e.g. invalid TMSI $Y_n$ means that the control nodes shall select MSC/VLR n) to further enhance the control of the redistribution.

If PRNG's are used, the core network node (e.g. a MSC/VLR) that is the subject of the redistribution will run PRNG's and for each user determine if it should be moved and given the pre-defined "invalidating" UI, or not. The PRNG can be run with the TMSI as seed and use different constants (or different iteration limits) for each operation. It is also possible to use just one generator all the time. In this case is any seed chosen, typically a constant value chosen once and for all. The PRNG is then just run one more time for each "occupied" TMSI when redistribution should be applied. In other words, a new PRNG numbers are generated successively as required such that the M:th PRNG number is used for making a decision of the M:th UI ever examined and also for computing the M+1:st number and so on.

Figure 5:
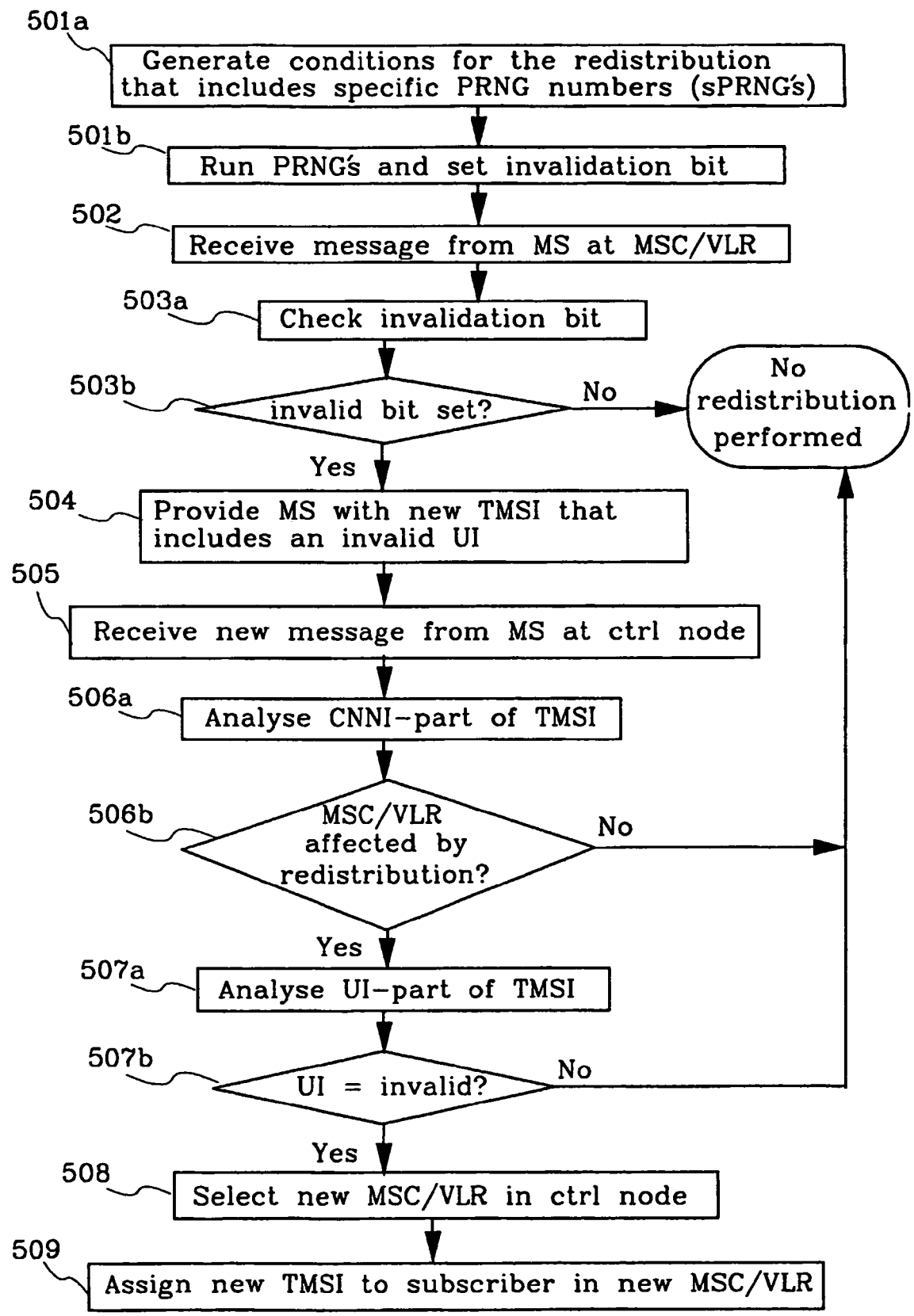
FIG. 5 is illustrating a flow chart of a fourth embodiment of the method according to the present invention.

FIG. 5 illustrates a flowchart of a fourth embodiment of the method according to the present invention. The same prerequisites as in the second embodiment, according to FIG. 3, applies.

According to a step 501a, the operator of the cellular system generates the conditions for the redistribution by deciding from which MSC/VLR subscriber information is to be moved, the number (or fraction) of subscribers to be affected and to which MSC/VLR's the corresponding subscriber information should be redistributed. In this case it is determined that 38% of the subscribers in MSC/VLR 104 (e.g. corresponding to PRNG numbers with a last octal number of 0, 1, or 2, i.e. with the last three bits equal to 000, 001 or 010) is to be affected and that the subscriber information is to be moved to MSC/VLR 103 or 105.

According to a step 501b, the MSC/VLR 104 runs PRNG-s for all stored subscribers in MSC/VLR 104, one by one, and stores the result by, e.g., setting an invalidation bit in the subscriber records if their UI's generates PRNG numbers with a last octal number of 0, 1, or 2. The MSC/VLR 104 also stops to assign new TMSI's with such UI's.

According to a step 502, the MSC/VLR 104 receives a first mobile originating request e.g. a location update, via control node 107, that includes a TMSI from the mobile station 116.

According to steps 503a–b, the MSC/VLR 104 checks the invalidation bit in the subscriber records, and if it is marked as invalid, which indicates that this subscriber is to be affected by the redistribution, the MSC/VLR 104 continues with step 504 below. Otherwise, the MSC/VLR 104 would have continued as usual.

According to a step 504, the MSC/VLR 104 provides the mobile station 116, via the access network 102, with a new TMSI that includes the previous CNNI and the invalid UI $Y_i$ (with all bits equal to '0') through a TMSI-reallocation procedure. The mobile station 116 stores the new TMSI without checking the validity of the UI. Hence, the mobile station is forced to change its TMSI by the MSC/VLR 104. It is also possible to provide the mobile station with a false LAI in this step to speed up the redistribution, i.e. to make the mobile station 116 to transmit a new message according to step 505 below immediately.

According to step 505, the control node 107 receives a second mobile originating request, e.g. a location update, that includes the new TMSI with UI $Y_i$ from the mobile station 116.

According to steps 506a–b, the control node 107 analyses the CNNI. As the CNNI indicates MSC/VLR 104, which is the subject of this subscriber redistribution, the control node continues with step 507 below. Otherwise, the control node would have continued as usual and forwarded the message to MSC/VLR 104.

According to steps 507a–b, the control node 107 analyses the UI. As the current UI is the invalid UI $Y_i$ the control node treats the TMSI as invalid and continues with step 508 below. Otherwise, the control node would have continued as usual and forwarded the message to MSC/VLR 104.

According to step 508, the control node 107 uses a redistribution algorithm to select a new MSC/VLR for the subscriber, in this case MSC/VLR 103 and forwards the message to MSC/VLR 103. The invalid UI $Y_i$ indicates that the control node shall use a specific redistribution algorithm that, in this case, excludes MSC/VLR 104. It is also possible to use the knowledge about MSC/VLR 104, i.e. the current MSC/VLR, and skip that MSC/VLR. As stated before, different invalid UI's can point out different algorithms and actions for the control node.

According to a step 509, the MSC/VLR 103 assigns a new (valid) TMSI to the subscriber, register the subscriber and provides the mobile station 116 with the new TMSI. The new TMSI contains a CNNI that identifies MSC/VLR 103 and an unoccupied UI. The subscriber information that belongs to the subscriber is now redistributed from MSC/VLR 104 to MSC/VLR 103.

Steps 502–509 are repeated for each access as long as the redistribution is in progress. The redistribution is terminated when all or most of the subscribers with an UI equal to UI $Y_i$, i.e. all or most subscribers with invalid TMSI's, have been moved from MSC/VLR 104 to MSC/VLR 103 or 105.

As stated in step 508 above, the control node 107 uses a redistribution algorithm (i.e. a specific distribution algorithm that is only used during a redistribution within the MSC-pool) instead of the distribution algorithm (i.e. the normal distribution algorithm that is used for new subscribers in the MSC-pool). This is because the control node can recognise that this second mobile originating request is from a mobile station with a subscriber that is to be affected by the redistribution.

As an alternative to use the previous CNNI in step 504 above, the MSC/VLR 104 can provide the mobile station 116 with the CNNI of the new MSC/VLR 103 and a specific or normal UI through the TMSI-reallocation procedure. The mobile subscriber will now be routed to the MSC/VLR at once at the next network access. The MSC/VLR 104 can avoid to give TMSI's with the same numbers as those used in MSC/VLR 103 if a specific UI is used (i.e. a UI only used for subscribers affected by a redistribution). If not, two TMSI's with identical numbers might occur at MSC/VLR 103. This is can be solved by asking for the IMSI during these rare cases.

The subscribers to be affected by the redistribution can be selected by using PRNG's in the above described embodiments. This can as an alternative be made on other criteria, e.g. technical criteria, to hit particular subscribers (e.g. with special payment conditions or service subscriptions).

In the embodiments above, the CNNI's and/or UI's in the TMSI's (the CNNI may also be separated from the TMSI) are analysed by the access network nodes to detect if they are part of an invalid TMSI etc. This can be made in a number of ways. In a first example, by comparing e.g. the UI against a stored "template" of an invalid UI or against a list of invalid UI's in an invalid-table (e.g. in step 507*a* in the fourth embodiment). This list of invalid UI's may contain different UI's associated with different actions, e.g. different invalid UI's may indicate different MSC/VLR's to which control nodes should forward the corresponding messages (and to which the subscriber information will be redistributed etc.)

In a second example, similar to the first one above, the network node that makes the analysis will compare each TMSI (or a specific part of it) with a certain bit pattern or patterns that are determined to indicate the invalid TMSI's (applicable in e.g. the second embodiment).

In the example above the bit patterns of the TMSI's, UI's and/or CNNI's are compared straight away but if PRNG's are used the bit patterns resulting from PRNG's are compared to the list(s) of invalid bit patterns or templates (applicable in the third embodiment).

In a third example, the CNNI's of the invalid TMSI's (e.g. 'ffff') are included in the CNNI-address tables (where the CNNI's are mapped on the "real" core network node addresses). These "invalid" CNNI's will not indicate any core network node address at all. An invalid TMSI is detected when a control node can not find a core network node address for the corresponding CNNI in the CNNI-address table.

If the cellular system uses a CNNI that is not included in the TMSI, approximately the same steps as in the above described embodiments can be performed, although the CNNI is transmitted separately together with the TMSI from the mobile station, e.g. in a location update.

If all subscribers that are registered in e.g. an MSC/VLR are to be affected by the redistribution, these subscribers can (as previously stated) be found by only analysing the CNNI part of the TMSI's (or the separate CNNI's). This means that any step(s) where the UI's are analysed or controlled in the above mentioned embodiments can be omitted. It is also possible to divide the redistribution into several steps to reduce the peak load (and any congestion risk) caused by the redistribution operation in the MSC-pool, specifically if a large number of subscribers are affected by the redistribution. Hence, the load is spread out over time as some of the affected subscribers proceed as normal until the subscriber information of some other of the affected subscribers have been moved. One example is to first select TMSI's with a UI that ends with '00', then also add those that ends with '01', then those that ends with '10' and at last those that ends with '11' (a four step redistribution operation). This step-wise redistribution can be used in all embodiments described above.

In the above described embodiments, the operator has performed a number of actions, e.g. generated the conditions for the redistribution (which MSC's and the number or fraction of subscribers to be affected by the redistribution) and informed control nodes and MSC/VLR's about the redistribution. These actions or parts of them can be made automatically in the system, e.g. with the help of the load supervision programme or by O&M functions in the cellular system, after the redistribution has been activated. The MSC/VLR 104 can, as an example, generate the redistribution conditions and inform the control nodes.

The load-unbalance that has been detected in the MSC-pool 101 can be detected by statistics like VLR-occupancy and CPU load that are regularly monitored by the operators in every node or, in a more advanced way, by a control function that automatically monitors all members of the MSC-pool.

It is possible to distribute the subscriber information unequally between the MSC/VLR's, e.g. 30% to MSC/VLR 103 and 70% to MSC/VLR 105 in the embodiments above where the control node can decide that it should use a redistribution algorithm (or even choose one out of several redistribution algorithms) instead of the distribution algorithm.

All the above embodiments concerns the case when subscribers are to be moved from a core network node in the CNN-pool, e.g. an MSC/VLR, due to a load-unbalance between the members in the pool. As previously stated there are other cases when the inventive method can be applied, e.g. when a core network node is to be shut down or removed or when a new core network node is to be inserted in the CNN-pool. The same embodiments as stated above can be used in these cases too but they are not started by detecting an unbalance.

As previously stated, the invention also includes means, arranged in the cellular radio communication system, for performing the steps described in the embodiments above. The inventive means can be completely or partially implemented as software in microprocessors, ASICS etc arranged in the cellular system.

As an example, the control nodes 106–108 include means for selecting a new MSC/VLR to a subscriber that is affected by a redistribution and means for determining which redistribution algorithm to use. The control nodes also includes means for determining if a subscriber is to be affected by the redistribution, e.g. by detecting if a TMSI or UI is invalid, and means for generating PRNG numbers.

As a further example, the MSC/VLR's 103–104 include means for selecting subscribers that are to be affected by the redistribution and means for preparing and controlling the redistribution of the selected subscribers. The MSC/VLR's also includes means for generating PRNG numbers and means for providing information regarding invalid TMSI's or specific PRNG numbers to the control nodes 106–108 and/or the mobile station 116.

The invention claimed is:

1. A method for redistribution of subscriber information within a pool of core network nodes in a cellular radio communication system, where said pool is arranged to be able to communicate with at least one control node in an access network, said method comprising the steps of:

selecting at least a first subscriber, which subscriber information shall be redistributed, and where said at least first subscriber is registered in a first core network node in said pool;

preparing said system to perform said redistribution after a mobile originating request transmitted from a first mobile station that is used by said at least first subscriber, comprising providing said first mobile station with a Temporary Mobile Station Identity (TMSI) arranged to be treated as invalid by said at least one control node and which is used during said mobile originating request; and concluding said redistribution after said mobile originating request.

2. The method recited in claim 1, wherein said step of preparing said system includes the step of:

providing said first mobile station with specific information that forces said mobile station to submit its International Mobile Station Identity (IMSI) to said system during said mobile originating request instead of a first TMSI, that is stored in said mobile station, and which entails that said at least one control node will select a new core network node, in which said at least first subscriber will be registered, when said redistribution is concluded.

3. The method recited in claim 2, wherein said specific information includes a second TMSI, equal to FFFFFFFF in hexadecimal, that replaces said first TMSI in said mobile station.

4. The method recited in claim 2, wherein said specific information includes said IMSI and a LAI.

5. A method for redistribution of subscriber information within a pool of core network nodes in a cellular radio communication system, where said pool is arranged to be able to communicate with at least one control node in an access network, said method comprising the steps of:

selecting at least a first subscriber, which subscriber information shall be redistributed, and where said at least first subscriber is registered in a first core network node in said pool;

preparing said system to perform said redistribution after a mobile originating request transmitted from a first mobile station that is used by said at least first subscriber, comprising providing at least said first control node with specific information that entails that said at least one control node will select a new core network node, in which said at least first subscriber will be registered, to conclude said redistribution when said mobile station have submitted said first TMSI during said mobile originating request; and concluding said redistribution after said mobile originating request;

wherein said specific information includes information about at least one bit value, which is present in a Temporary Mobile Station Identity (TMSI) and which points out that said subscriber information of said at least first subscriber shall be redistributed.

6. A method for redistribution of subscriber information within a pool of core network nodes in a cellular radio communication system, where said pool is arranged to be able to communicate with at least one control node in an access network, said method comprising the steps of:

selecting at least a first subscriber, which subscriber information shall be redistributed, and where said at least first subscriber is registered in a first core network node in said pool;

preparing said system to perform said redistribution after a mobile originating request transmitted from a first mobile station that is used by said at least first subscriber, comprising providing at least said first control node with specific information that entails that said at least one control node will select a new core network node, in which said at least first subscriber will be registered, conclude said redistribution when said mobile station have submitted said first TMSI during said mobile originating request; and concluding said redistribution after said mobile originating request;

wherein said specific information includes information about at least one number: that identifies a Temporary Mobile Station Identity (TMSI); that has been generated by a PRNG; and which points out that said subscriber information of said at least first subscriber shall be redistributed.

7. The method recited in claim 2, wherein said specific information also includes an LAI.

8. The method recited in claim 2, wherein said specific information includes information which indicate that said at least one control node shall select one out of at least two different algorithms for performing said selection of a new core network node.

9. The method recited in claim 1, wherein said at least first subscriber is selected dependent on at least one bit value in a first identifier that is assigned to said at least first subscriber.

10. The method recited in claim 1, wherein said at least first subscriber is selected dependent on the result of a mathematical function.

11. The method recited in claim 1, wherein said at least first subscriber is selected by random.

12. The method recited in claim 1, wherein said at least first subscriber is selected due to the fact that all subscribers that are registered in said first core network node are to be affected by said redistribution.

13. The method recited in claim 9, wherein said selection is restricted to a selection between subscribers from a specific subset of subscribers in said pool.

14. The method recited in claim 13, wherein said specific subset of subscribers in said pool is subscribers that are registered in a specific core network node in said pool.

15. The method recited in claim 9, wherein said first identifier is a Temporary Mobile Station Identity (TMSI).

16. The method recited in claim 1, wherein said redistribution is performed in steps, by preparing one group of subscribers at the time for said redistribution, in those cases where a number of subscribers are selected for said redistribution.

17. The method recited in claim 2, wherein said specific information includes a specific LAI or a specific TMSI that are used as an action indicator, which makes said at least one control node to perform a specific action with said at least first subscriber after said mobile originating request.

18. A core network node arranged in a pool of core network nodes in a cellular radio communication system, and where said core network node is arranged to be able to communicate with at least one control node in an access network, said core network node comprising:
　　means for selecting subscribers that are to be affected by a redistribution within said pool; and
　　means for preparing said system to perform said redistribution after a mobile originating request from mobile stations used by said selected subscribers;
　　wherein said means for selecting is arranged to select said subscribers dependent on the result of a mathematical function, and where at least one part of a Temporary Mobile Station Identity (TMSI) is used as an input to said mathematical function.

19. The core network node recited in claim 18, wherein said means for selecting is arranged to select said subscribers dependent on at least one bit value in a first TMSI that is assigned to each one of said subscribers.

20. The core network node recited in claim 18, wherein said means for preparing is arranged to provide said mobile stations with a new TMSI, equal to FFFFFFFF in hexadecimal, that replaces a TMSI that is currently stored in said mobile stations.

21. The core network node recited in claim 18, wherein said means for preparing is arranged to provide said mobile stations with new TMSI's that are treated as invalid by said at least one control node and which replace TMSI's that are currently stored in said mobile stations.

22. A control node arranged to be able to communicate with a pool of core network nodes in a cellular radio communication system, said control node comprising:
　　means for determining if a subscriber, in communication with said control node, is to be affected by a redistribution within said pool; and
　　means for selecting a new core network node within said pool to said subscriber if he is determined to be affected by said redistribution;
　　wherein said means of determining calculates a PRNG number, based on at least a part of a received TMSI, to detect if said subscriber is to be affected by said redistribution.

23. The control node recited in claim 22, wherein said means of determining analyses at least one bit value in a received TMSI to detect if said subscriber is to be affected by said redistribution.

* * * * *

UNITED STATES PATENT AND TRADEMARK OFFICE
CERTIFICATE OF CORRECTION

PATENT NO. : 7,054,629 B2
APPLICATION NO. : 10/487377
DATED : May 30, 2006
INVENTOR(S) : Turina et al.

It is certified that error appears in the above-identified patent and that said Letters Patent is hereby corrected as shown below:

On The Title page, Item (75), under "INVENTORS", in Column 1, Line 3, delete "Aachen (DE)" and insert -- Lund (SE) --, therefor.

On The Title page, Item (56), under "U.S. PATENT DOCUMENTS", in Column 2, Line 8, delete "6,823,295 B1" and insert -- 6,823,295 B2 --, therefor.

In Column 11, Line 30, delete "TMSI'S." and insert -- TMSI's. --, therefor.

In Column 16, Line 26, in Claim 6, after "registered," insert -- to --.

Signed and Sealed this

Eighteenth Day of December, 2007

JON W. DUDAS
*Director of the United States Patent and Trademark Office*